United States Patent [19]
Holwerda

[11] 4,191,348
[45] Mar. 4, 1980

[54] DEICING SYSTEM

[75] Inventor: Sidney J. Holwerda, Hudsonville, Mich.

[73] Assignee: Holwerda-Huizenga Co., Grand Rapids, Mich.

[21] Appl. No.: 850,229

[22] Filed: Nov. 10, 1977

[51] Int. Cl.² .............................................. B64D 15/10
[52] U.S. Cl. .............................. 244/134 C; 126/271.1; 134/101; 134/105; 134/172; 137/340; 137/341; 137/351; 137/360; 137/563; 239/124; 239/199
[58] Field of Search ................. 126/271.1; 134/100, 134/101, 105, 108, 123, 172; 137/334, 340, 341, 351, 360, 563, 564; 239/124, 135, 165, 197, 199; 244/134 C

[56] References Cited

U.S. PATENT DOCUMENTS

| 3,243,123 | 3/1966 | Inghram et al. | 239/124 |
| 3,533,395 | 10/1970 | Yaste | 244/134 C X |
| 3,612,075 | 10/1971 | Cook | 244/134 C X |
| 3,835,498 | 9/1974 | Arato | 134/123 X |
| 3,854,054 | 12/1972 | Conn | 134/45 X |
| 3,929,153 | 12/1975 | Hasty | 137/564 X |
| 4,032,090 | 6/1977 | Thornton-Trump | 244/134 C |
| 4,073,437 | 2/1978 | Thorton-Trump | 239/165 X |

FOREIGN PATENT DOCUMENTS

767362 6/1952 Fed. Rep. of Germany ....... 244/134 C

*Primary Examiner*—Gerald A. Michalsky
*Attorney, Agent, or Firm*—Price, Heneveld, Huizenga & Cooper

[57] ABSTRACT

A centralized deicing system includes, in one embodiment, a large fixed location supply tank of deicing fluid which is heated and supplied to a plurality of terminal boxes located at several aircraft loading ramps. The system includes a recirculation loop for preheating the conduits for the deicing fluid by circulating heated deicer fluid through them before application to an aircraft. Each terminal box includes a coupler for receiving ends of a hose employed on a movable vehicle used for deicing an aircraft to also preheat the hose. In one embodiment of the invention, separate tanks of water and glycol are provided, and the terminal box includes a mixing valve which can be remotely controlled by an operator for blending the heated water and glycol in the desired proportion depending on weather conditions.

32 Claims, 4 Drawing Figures

DEICING SYSTEM

BACKGROUND OF THE INVENTION

The present invention relates to deicing systems for aircraft.

In northern climates during winter months, aircraft which either are parked on the ground overnight or which are on the ground during severe winter weather, frequently accumulate snow or ice on the airfoil surfaces. It is, naturally, necessary to remove this material prior to takeoff and such removal has been the subject of a variety of deicing equipment in the prior art.

The most popular equipment has been the utilization of a self-contained vehicle, such as a truck, having an extensible boom mounted thereon and including a tank containing a mixture of water with a deicing fluid such as ethylene glycol or propylene glycol or mixtures thereof and which is heated to from 160° to 190° F. by a self-contained tank heater on the truck. The heating deicing fluid is then pumped through a hose and nozzle to the end of the extensible boom where the operator directs a stream of the heated deicing fluid mixture onto the aircraft. This removes the snow and/or ice and provides a coating of glycol largely preventing further formation of the freezing substance. This deicing procedure normally takes place just prior to the plane's departure after which the aircraft's normal internal electrical deicing systems are employed. With such vehicles, the tank size is, of necessity, limited and once emptied, the recovery time for reheating deicing fluid added to the tank is significant and causes highly undesirable delays in aircraft departure. Representative of such a deicing system is German Patentschrift No. 767,362, published June 13, 1952. The capital investment for several vehicles necessary to properly maintain an air service with such a system can be prohibitive. Also, the tank heaters have been gasoline powered and have presented a significant safety hazard.

Other non-portable deicing systems have been proposed and are represented by U.S. Pat. Nos. 3,533,395, issued Oct. 13, 1970, to Edward E. Yaste, and 3,612,075, issued Oct. 12, 1971, to Vernon H. Cook. Both of these patents disclose fixed installation systems whereupon an aircraft is brought into a deicing station with boom structures having a plurality of nozzles for spraying heated deicing fluid over the aircraft surfaces and recovering the fluid and recirculating it after filtration, concentration, and reheating. These systems have the advantage of providing larger volumes of deicing fluid and hence little or no recovery delays but the disadvantage that the installation is extremely expensive and requires each aircraft to move through the deicing station remote from the ramps prior to takeoff. This, naturally, can involve a significant delay and therefore such prior art has not represented a commercially successful solution to the deicing problem.

SUMMARY OF THE INVENTION

The present invention overcomes the difficulties of the prior art by providing a system whereupon a fixed heated deicing fluid source is provided with conduits which extend to each of a plurality of terminals located at each of the aircraft loading ramps. Such a system permits a relatively inexpensive deicing vehicle carrying only a hose and nozzle to be coupled to the terminal at the aircraft's normal loading ramp and deicing to take place at the ramp. The system of applicant's invention incorporates a recirculation system whereupon the conduits from the supply of heated deicing fluid can be preheated by the circulation of deicing fluid therethrough as well as through the applicating hose prior to deicing of the aircraft. This assures that the fluid when sprayed onto the aircraft is at or near its operating temperature and is most effective in removal of the frozen substance from the plane.

According to another aspect of the present invention, separate heated water and deicing fluid supplies are provided and a remotely controllable mixing valve is provided at each of the terminals such that the operator can, depending upon atmospheric conditions, adjust the blend of deicing fluid and water as required to efficiently deice the aircraft.

These and other features, advantages and objects of the present invention can best be understood by reference to the following description thereof together with the accompanying drawings in which:

DETAILED DESCRIPTION OF THE PREFERRED EMBODIMENT

Figure 1:
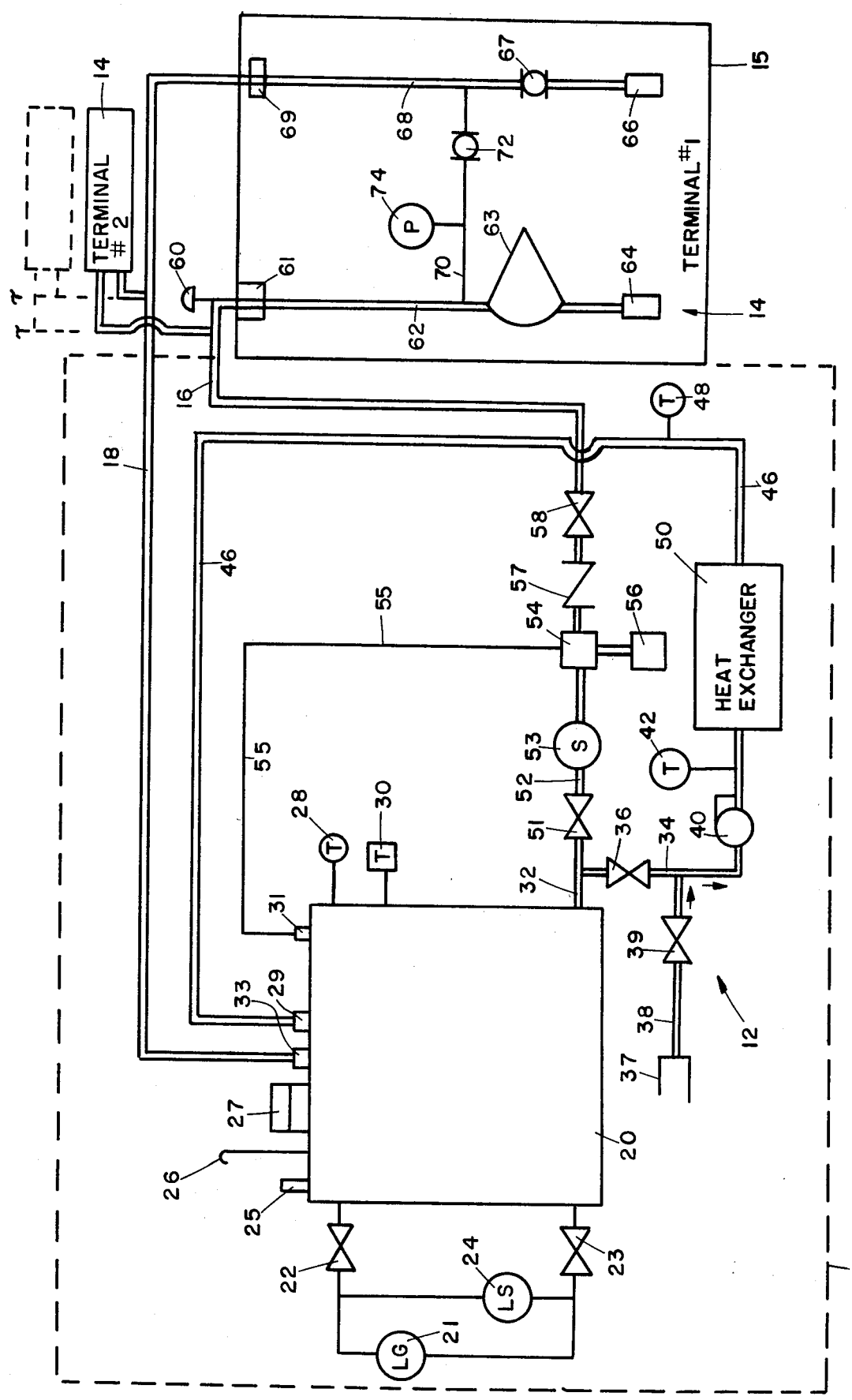
FIG. 1 is a diagram partly in block and schematic form of one embodiment of the present invention.

Referring now to FIG. 1 there is shown one embodiment of the present invention in which there is positioned within a building 10, typically the loading ramp area of a passenger terminal serving a given airline and in proximity to several loading ramps, a heating and pressurization system 12 and a plurality of terminals 14 coupled to the heating and pressurization system by means of conduits 16 and 18. The terminals 14 are positioned on the outer wall of building 10 in the loading ramp area for each loading ramp to be serviced by the deicing system. In some installations, terminals can be positioned between two adjacent loading ramps such that a single terminal can service two loading ramp areas.

The heating and pressurization system 12 comprises a source 20 of deicing fluid which, in the embodiment shown, is a 2000 gallon storage tank having a level sight gauge 21 coupled to the tank through valves 22 and 23 which are normally open such that the level gauge indicates to the system operator the level of fluid within the tank. Also coupled to valves 22 and 23 which is a low fluid level cutoff switch 24 employed, as described below, to electrically disconnect the system's pump in the event liquid in tank 20 is below a predetermined level thereby preventing damage to the pump.

Tank 20 includes a waterfill inlet 25 for filling the tank to a predetermined level whereupon a deicing fluid is added to form a deicing mixture having a concentration of water and deicing fluid suitable for the weather conditions at a given area. In one installation, the deicing fluid was Dow Aircraft Deicing Fluid 146 commercially available from the Dow Chemical Company. This fluid is a composition of ethylene and propylene glycols, a wetting agent, and anti-foam agent, and a corrosion inhibitor. Hereinafter the deicing fluid will be referred to simply as glycol.

Tank 20 also includes an air vent 26 for admitting air to replace displaced liquid as the tank fluid is employed for deicing an aircraft and a manhole 27 for access to the interior of the tank. A temperature gauge 28 suitably mounted to the tank indicates the temperature of liquid therein while a thermostat control 30 also mounted to tank 20 controls a circulation pump 40 as described below to circulate liquid from tank 20 through a heat exchanger 50 as required to maintain the temperature of the fluid in the tank at the desired level. In the preferred embodiment, temperature controller 30 was set within the range of 160° to 190° F. for the mixture within tank 20.

Tank 20 includes a fluid outlet 32 coupled to a pair of fluid conduits 34 and 52. The first conduit 34 has a shutoff valve 36 between conduit 34 and the outlet 32. Conduit 34 couples tank 20 to a circulating pump 40 electrically coupled to controller 30 and to an electrical power supply for actuating the pump. Coupled to conduit 34 also is a glycol inlet conduit 38 and a quick disconnect fitting 37 at one end for coupling a supply of glycol to the conduit 38. Also a shutoff valve 39 is provided for isolating the glycol inlet from conduit 34 once the desired amount of glycol has been added to the system.

Between circulating pump 40 and the heat exchanger 50 there is provided a temperature gauge 42 to measure the input temperature of fluids supplied to the heat exchanger 50. The heat exchanger comprises an electric commercially available Chromalox type CEW hot water boiler suitably coupled to a source of electrical operating power and set to heat the fluid from inlet conduit 34 to the desired operating temperature in the range of 160° to 190° F. Outlet conduit 46 from boiler 50 returns the heated fluid to the heated fluid inlet 29 of tank 20. A thermometer 48 is positioned in outlet conduit 46 to provide an indication to the operator of the temperature of fluid from heat exchanger 50.

Before describing the operation of the system for deicing, a brief description of the filling of the system is provided. Initially the concentration of glycol to water is ascertained and depends upon the ambient temperature of the airport at which the deicing system is employed. The supplier of glycol provides suitable charts for ascertaining this concentration in volumetric percentages. Accordingly, water is supplied to tank 20 through inlet 25 to fill the tank with the desired amount of water, it being understood the tank will subsequently be filled with glycol to make up the desired percentage which typically will range from 30 to 50 percent but can be as low as 10 or as high as 70 percent or even higher in some installations. Glycol is then added to the tank by closing valve 36 and opening valve 39 while, at the same time, actuating circulator pump 40 to draw glycol from a supply of the same through conduit 38 and 34 into the tank 20 via the heat exchanger 50 and conduit 46 communicating with inlet 29 of the tank. Once the tank has been filled, valve 39 is turned off and valve 36 opened permitting the fluid solution to be circulated around the closed loop including tank 20, conduit 34, heat exchanger 50, and conduit 46 back to the tank to heat the fluid deicer solution and mix the glycol and water thoroughly. Once heated to the desired temperature, the heat exchanger 50 will be turned off as will pump 40 in response to thermostat control 30 and the fluid in tank 20 which is suitably insulated by a jacket of fiberglass wrap will maintain the fluid at a desired temperature for a significant length of time. As cooling occurs, the thermostatic control 30 will actuate pump 40 and heat exchanger 50 as required to reheat the fluid to the holding temperature. Thus, the system described thus far provides a source of preheated deicing fluid available for the deicing system.

At outlet 32 is a second fluid conduit path including conduit means 52 having a valve 51 coupled between the conduit 52 and outlet 32 from tank 20. Conduit 52 couples valve 51 to a pump strainer 53 having its outlet coupled to the inlet of a centrifugal pump 54 driven by an electrical motor 56. Pump 54 includes a bleeder outlet having a conduit 55 coupled thereto and returning to the top of tank 20 by a tank inlet 31. The outlet of pump 54 is coupled to a check valve 57 and through a second shutoff valve 58 to supply conduit 16 extending to the terminals 14. Conduit 16 is suitably wrapped with insulating materials to reduce heat loss therefrom. Each of the terminals 14 are mounted, preferably in a recessed mounting box 15, to the wall of building 10 with an access door (not shown) for closing the unit when not in use. The fluid supply conduit 16 communicates with each terminal and includes a shock absorber 60 which absorbs surges of pressure which can occur in the relatively high pressure (300 psi) line 16 when the control valves are opened and closed. The shock absorber 60 is a commercially available unit mounted to the conduit 16 near each of the terminals 14.

Each of the terminals 14 include a suitable coupling 61 for coupling conduit 16 to the terminal and a conduit 62 from coupling 61 to a female quick disconnect fitting 64. Between output fitting 64 and conduit 62 there is provided a globe valve 63 which is opened to provide the desired flow rate of 20 to 30 gallons per minute (gpm) during preheating of the application hose or 30 to 40 gpm for deicing of the aircraft. The quick disconnect female fitting 64 is a commercially available unit which has a built-in check valve.

Spaced from fitting 64 is a second female quick disconnect fitting 66 coupling to a return conduit 68 through a ball valve 67. Return conduit 68 is coupled to the recirculation conduit 18 of the system by means of an outlet fitting 69. A recirculation flow path between conduit 16 and 18 of the system is provided within the terminal and includes a conduit 70 coupling conduit 62 and 68 through a ball throttling valve 72 which is adjusted to permit a 1 to 2 gpm constant flow rate of the heated deicing fluid for maintaining conduits 16 and 18 preheated during standby operation of the system. A pressure gauge 74 is provided to monitor the pressure which typically is approximately 300 psi. Gauge 74 is is calibrated from 0 to 600 psi in one installation.

Each of the remaining terminals 14 are similarly constructed and are coupled to the supply conduit 16 and recirculation conduit 18 such that during standby operation each of the terminals provide recirculation of approximately a gallon to two gallons per minute of deicing fluid through their recirculation conduits.

Figure 2:
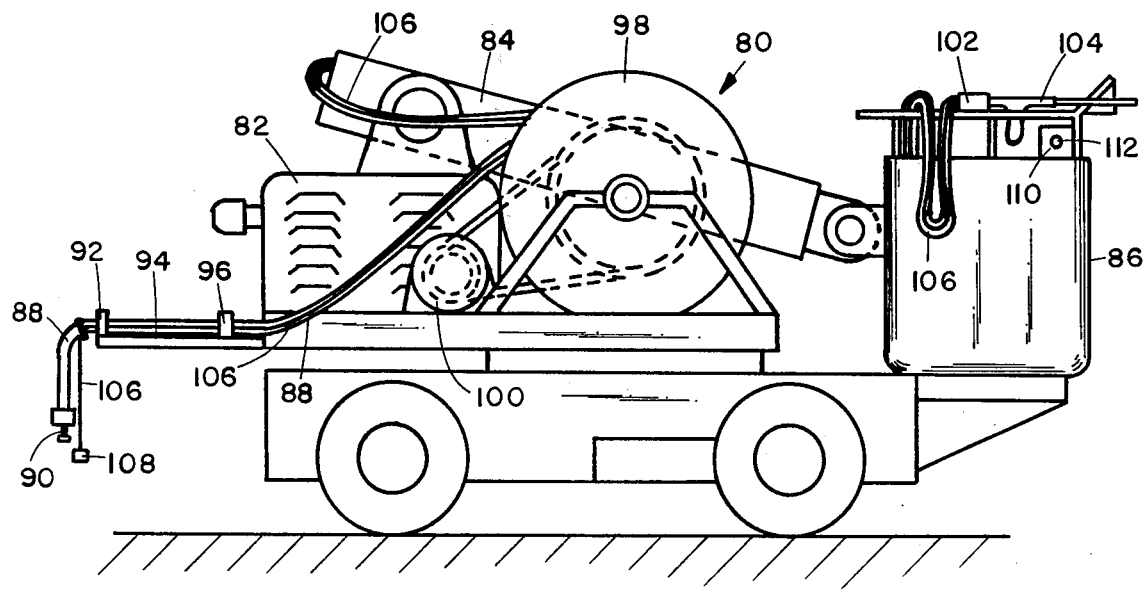
FIG. 2 is a side elevational view of a vehicle which can be employed with the present invention.

Prior to deicing of the aircraft, it is desirable also to preheat the applicating hose on the deicing vehicle as shown in FIG. 2 and now described. The vehicle 80 shown in FIG. 2 is commercially available and forms no part of the present invention other than to provide the applicating hose for the fluid provided by the system of the present invention. Vehicle 80 is self-propelled by a suitable internal combustion engine 82 and includes an extensible and elevatable boom 84 controlled from a basket 86 commonly referred to as a cherry picker. The vehicle carries at least a 1 inch diameter flexible applicating hose 88 having at one end a male quick disconnect fitting 90 adapted to fit within the fittings 64 of any one of the terminals 14. Guide means 92 are mounted on the end of a boom 94 at one end of the vehicle and include a plurality of rollers for guidably supporting the hose through an end of the boom 94. Intermediate guide rollers 96 are also provided for guidably supporting the hose 88 which then is wrapped around a drum 98. The hose is payed out automatically by coupling connector 90 in fitting 64 and moving the vehicle. For rewind of the hose on drum 98, however, an electrical motor 100 is provided for rotating the drum and winding the hose as the vehicle 80 is driven back toward the terminal 14.

The opposite end of the hose 88 extends up the boom into the basket 86 and includes a quick disconnect coupling 102 having a male end which can be fitted into the female coupling 66 of the terminal 14 and a female end which is coupled to a suitable spraying nozzle 104. Nozzle 104 is of conventional design to provide a stream of deicing liquid which can be directed by the operator in basket 86 onto the surfaces of the aircraft. For the alternative embodiment shown in FIGS. 3 and 4, also coupled with the hose is an electrical control cable 106 having a connector 108 at one end for connecting to a mating connector on the terminal 230 shown in FIG. 4 and leading to a control box 110 on the basket 86 which includes a control knob 112 for controlling the mixing of glycol and hot water as described more fully below in conjunction with the alternative embodiment shown in FIGS. 3 and 4.

For preheating the hose 88 in either embodiment, the vehicle 80 is brought in the vicinity of the terminal 14 with male connector 90 at one end of the hose attached to fitting 64 and male connector 102 at the opposite end of the hose plugged into the fitting 66. Valves 63 and 67 (FIG. 1) of the terminal are then open to provide a 20 to 30 gallon per minute flow rate for approximately 1 to 2 minutes which is sufficient for preheating hose 88 and charging it with heated deicing fluid. Valve 67 is then shut off and fitting 102 removed from female fitting 66 and connected to nozzle 104 whereupon the vehicle is moved to the aircraft for the deicing operation. Before moving the vehicle, valve 63 is adjusted for the desired flow rate by opening the valve an additional amount if desired. Nozzle 104 naturally has an integral on/off valve. The handle of valve 63 can be calibrated for the desired flow rates.

Thus, it is seen that the embodiment shown in FIGS. 1 and 2 provide a centralized large supply of heated deicing fluid mixture of water and glycol which can be of sufficient quantity to service an airport for considerable length of time. Also, as the fluid is withdrawn from the system, it can be resupplied if desired so that the tank 20 remains relatively full of deicing liquid and its temperature remains constant thereby avoiding the recovery time of some of the prior art systems. By recirculating a small amount of heated deicing fluid during standby operation, the temperature of fluid available at each of the terminals 14 is at its desired operating temperature. By providing means for recirculating fluid through the applicating hose or preheating of the system just prior to deicing operation, the fluid available as deicing is initiated, is at its operating temperature and deicing can be effected rapidly with a minimum use of deicing fluid. Also, flexibility of the hose is assured for ease of handling.

For smaller installations, a single deicing vehicle 80 is sufficient for use in conjunction with the various terminals. Naturally, as the number of terminals 14 increase and different sides of building 10 are serviced by the system, additional vehicles can be employed simultaneously. Having described the first embodiment of the invention, a detailed description of an alternative embodiment of the invention is now presented.

In the alternative embodiment, the central source of deicing fluid comprises a 6,000 gallon water tank 120 and a separate 4,000 gallon glycol tank 180. Tank 120 includes an air vent 122, a recirculation input 124 to which the return or recirculation conduit 125 is coupled, a hot water inlet 126 to which the hot water conduit 127 is coupled, and a hot water outlet 128 to which hot water supply line 129 is coupled. The tank also includes a sight gauge 130 indicating the level of water in the tank as well as a low water cut-out switch 132 for deactivating the water pump 160 in the event the water in the tank 120 falls below a predetermined level. In addition, associated with tank 120 is a thermometer 134 indicating the water temperature in the tank and a water level control switch 136 operating in conjunction with the water supply solenoid operated switch 150 as described below for maintaining tank 120 substantially filled at all times. A thermostat control 142 is also coupled to the tank for controlling circulating pump 172 as described below.

In order to supply tank 120 with water, a water inlet line 131 is provided and coupled to the building's normal supply. Conduit 131 is coupled to the inlet 141 of a heat exchanger 140 through first and second manually operated valves 133 and 137 with two check valves 135 therebetween. Also, solenoid operated valve 150 is coupled between conduit 131 and the inlet 141 of heat exchanger 140. Valve 150 is controlled by water level switch 136 such that when the water falls below a predetermined level in tank 120, water will flow through the heat exchanger and into the tank inlet 126 through conduit 127 by the actuation of solenoid valve 150 until such time as the water level has returned to the desired level. Valves 133 and 137 are normally opened, permitting such operation. Thus, the filling stream of water passes through heat exchanger 140 as well as makeup water during operation of the system.

In the preferred embodiment shown, the heat exchanger 140 is a commercially available Bell and Gossett type SU heat exchanger which is steam operated and receives steam from a steam input line 143 passing steam through the exchanger through a plurality of valves including first and second manually operated valves 145 and 149 between which there is provided a thermostatically controlled valve 147 controlled by thermostatic bulb 144 positioned in line 127. A thermostatic switch 142 positioned on tank 120 detects the water temperature therefrom and actuates pump 172 whenever the water falls below a minimum temperature of about 160° F. Pump 172 has an inlet conduit 171 coupled to tank outlet conduit 129 and its output coupled through a check valve 174 and manually operated valve 175 to the inlet 141 of heat exchanger 140. The flow path of the water is indicated in the drawing figure by the arrows on the associated conduits. Pump 172 is actuated by thermostat 142 such that water recirculation through the heat exchanger 140 occurs only as required. Normally the water temperature is maintained between 160° and 190° F. in the embodiment shown. In the event of failure of valve 147, a backup, manually operated bypass valve 150 is provided to permit entry of steam into the heat exchanger 140. The heat exchanger includes a condensate outlet 152 which communicates with the condensate receiver 154 whereupon the liquid collected through the heat exchanger is pumped by means of pump 155 to an outlet 159 through conduit 151, check valve 153, valve 157, and a condensate flow meter 156. Meter 156 provides a basis for allocating costs to the operation of the system by the supplier of steam. The condensate receiver and pumps may include backup pumps and a parallel flow path as required for higher reliability.

Water heated by heat exchanger 140 and stored in tank 120 is then supplied to the first supply conduit 165 by means of pump unit 160 receiving water from outlet conduit 129 of the tank 120. Pump unit 160 is driven by an electrical motor 162 suitably coupled to an electrical supply and includes a centrifugal pump 164 receiving water from tank 120 through a strainer 161 and a valve 163. An inlet pressure gauge 167 is provided for measuring the pump input pressure. The pump outlet is coupled to a conduit 165 through a check valve 169 and manually operated valve 170. An outlet pressure gauge 171 is provided for checking the pressure of the first supply conduit 165 which is at least about 300 psi. Conduit 165 communicates with each of the terminals 230 as described more fully below in conjunction with FIG. 4. Similarly, return conduit 125 also communicates with each of the terminals shown in the preferred embodiment.

Conduits 125 and 165 can be quite lengthy inasmuch as tanks 120 and 180 are positioned centrally within a building and the terminals 1 through 7 or more are positioned at the aircraft loading ramps and can be several hundred feet away. In order to preheat the various conduits, each of the terminals 230 provide a bleeder path between conduits 165 and 125 such that a slight amount of water can be continuously recirculated around the conduits. To maintain conduits 125 and 165 to the terminals preheated and to prevent their freezing, a second recirculation pump 176 is provided and has its input coupled to conduit 171 communicating with the tank outlet conduit 129. The outlet of circulation pump 176 is coupled to a check valve 177, manually operated valve 178, and to the first supply conduit 165 through conduit 179. The pressure developed by pump 176 forces water from the tank outlet 128 into supply conduit 165 into all of the terminals 230. A bleeder valve in the terminal permits this water to return via return or recirculation conduit 125 to tank 120 thereby maintaining circulation between the first supply conduit and the return conduit. This standby mode of operation thereby preheats all of the conduits in the system in which the water flows and maintains the water in tank 120 at the desired temperature.

The glycol stored in tank 180 is the same as that described in the first embodiment. Tank 180 includes an air vent 182, glycol input 183 to which a glycol supply line 184 is coupled, a bleeder input line 185 which receives excess glycol from a pressure regulator 210 as described more fully hereinafter and a glycol output 186 located near the bottom of the tank. Tank 180 also includes a liquid level sight gauge 187 and a low level cutoff switch 188 employed to deactivate the glycol pump 200 in the event the glycol in tank 180 falls below a predetermined level. The tank is initially filled typically by a tank truck containing glycol by means of an input connector 190 through valve 192 and input 194. Valve 191 is normally closed during filling and pump 200 actuated to draw the glycol from the supply tank through valve 193, a strainer 195, and into pump 196 associated with pump unit 200. Pump 196 is driven by an electric motor 198 suitably coupled to an electrical supply system. The output of pump 196 is coupled to a check valve 199 and a manually operated valve 201. Valve 201 communicates with conduit 204 in turn coupled to filler conduit 184 through valve 187 opened during filling of tank 180. Once tank 180 is filled, valves 187 and 192 are closed and valve 191 is opened.

An output pressure gauge 202 is provided for measuring the pump output pressure. Valve 201 on the outlet of the glycol pump is coupled to a pressure regulator 210 via output conduit 204. Pressure regulator 210 is adjustable and provides an output pressure of approximately 300 psi, and depending upon the glycol demand, will bleed glycol back into tank 180 through bleeder line 185 automatically as required to maintain an output pressure of 300 psi on the second supply conduit 220 which communicates with each of the terminals 230. The directional flow of glycol is indicated by the arrows accompanying conduit 200. The glycol, which has a very low freezing temperature, is not preheated and can be supplied to the external terminals without fear of freezing. In addition to the bleeder line 185, a relief valve 208 is provided and coupled to the output of pump unit 200 for either recirculating the fluid through pump 200 via conduit 207 or to the tank fill conduit 184 through valve 187 when open. Thus, pump unit 200 is employed for initially filling the tank and for pressurizing the glycol supply line.

Pump units 160 and 200 are actuated as required by the operator when deicing is desired and can either be operated remotely from any one of the terminals 230 or at the central location as desired. This is accomplished by conventional electrical switch circuit coupling motors 162 and 198 to the electrical supply line for their actuation. Each of the pumps in the system can include parallel flow backup pump systems to assure the system will remain operational in the event one of the pumps or pump motors should fail.

Figure 4:
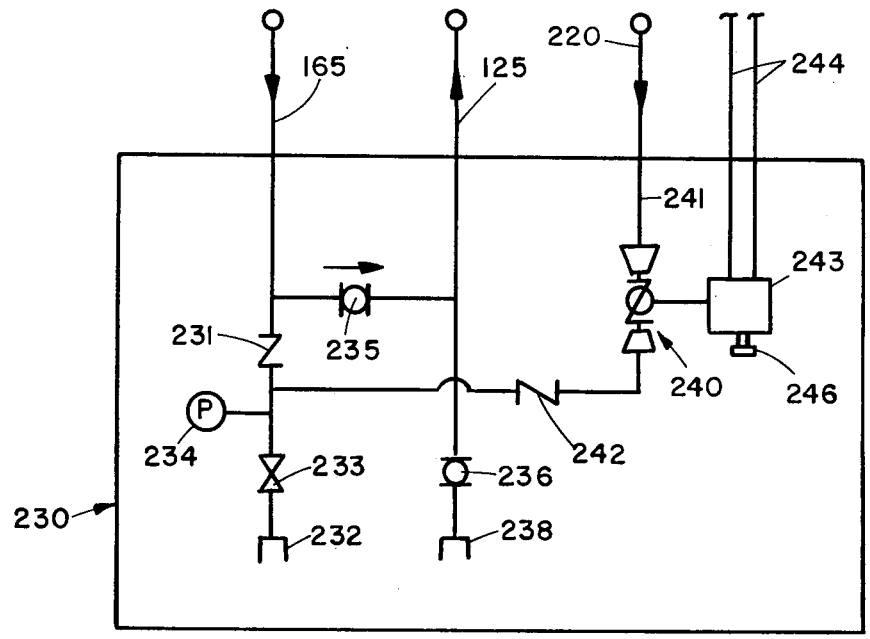
FIG. 4 is a detailed schematic diagram of one of the terminals incorporated in the embodiment of the invention shown in FIG. 3.
Figure 3:
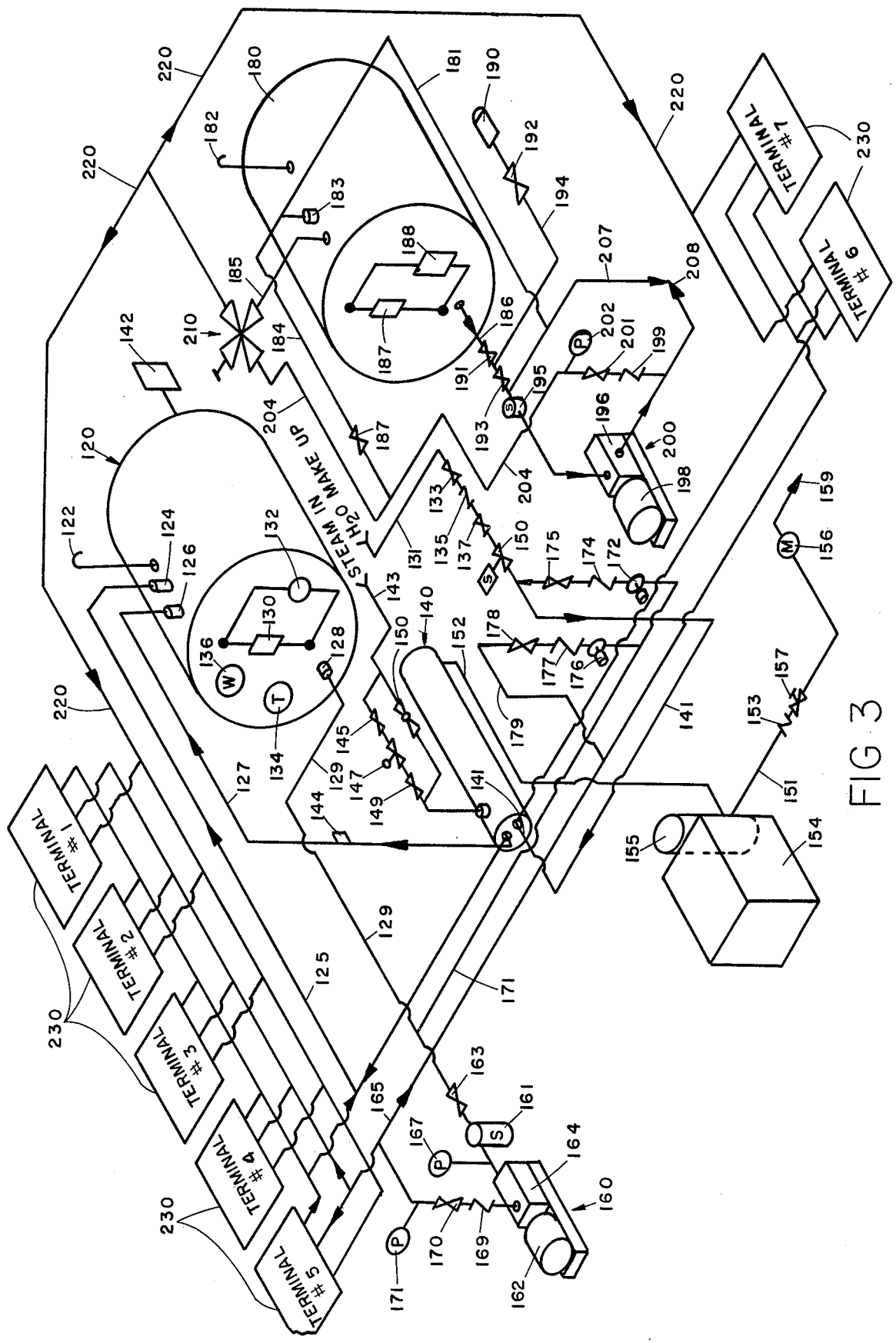
FIG. 3 is a diagram partly in block and schematic form showing an alternative embodiment of the present invention.

One of the identical terminals 230 associated with the embodiment shown in FIG. 3 are shown in FIG. 4 and are mounted in a suitable enclosure typically recessed in the outer wall of the building housing the tanks 120 and 180 and positioned between aircraft loading ramps for easy access to the aircraft. The hot water supply line 165 is coupled to the terminal by suitable fittings and communicates with a female quick disconnect fitting 232 by means of a check valve 231 and a globe valve 233. A pressure gauge 234 is coupled between valves 231 and 233 and monitors the pressure which, as noted above, is approximately 300 psi in the preferred embodiment. The return conduit 125 is coupled to a ball valve 236 and to a second female quick disconnect fitting 238 for receiving the nozzle end of the applicating hose while the remaining end of the application hose is coupled to connector 232. A bleeder valve 235 is positioned between conduits 125 and 165 and is adjusted to provide a flow rate of from 1 to 2 gpm to provide in conjunction with the operation of pump 176 (FIG. 3) continuous preheating of conduits 125 and 165 and preventing freezing of the portions of these conduits within the terminal.

Each of the terminals 230 also includes a conduit 241 coupling the glycol input line 220 to an electrically controlled mixing valve 240. The outlet of valve 240 is coupled to the hot water conduit 165 through a check valve 242. Valve 240 is controlled by an electrical actuator 243 receiving operating power from electrical lines 244 suitably coupled to the building's power supply system. An electrical connector 246 is provided for connection to a mating connector 108 coupled to the electrical control cable 106 (FIG. 2) associated with the deicing vehicle 80. The commercially available actuator 243 is controlled by knob 112 on control box 110 of the vehicle to open or close valve 240 as desired to provide the desired percentage mixture of glycol from the second supply conduit 220 with the hot water from first supply conduit 165 the combination being supplied to the outlet connector 232 to the applicating hose 88.

As in the first embodiment, the applicating hose 88 can be preheated by coupling the male quick disconnector coupler 90 to the female connector 232 and the male connector 102 to the female connector 238 for recirculating hot water through hose 88 via supply conduit 165 and return conduit 125. During preheating, pump unit 160 is actuated to supply a volume of approximately 60 gpm. Actuation of pump 160 simultaneously turns off the small recirculation pump 176.

Thus, with the system shown in FIG. 3, a very high volume of hot water can be supplied via the 6000 gallon tank 120 and blending in an amount of glycol from tank 180 is attained by the remotely controllable mixing valve 240 which can be controlled from the applicating vehicle. Naturally, mixing valve 240 also can be replaced with a manually operated valve such that the desired premixing can be selected at terminal 230 although it is preferable to remotely control the mixing valve as the operator applies the deicing fluid and can ascertain the effectiveness of the mixture and adjust it as desired.

The system conduits shown in the first and second embodiments are conventional, it being understood that the conduits carrying heated fluid are suitably insulated and the conduits have sufficient diameters to accomplish the desired flow rates and pressures. It will become apparent to those skilled in the art that various modifications to the preferred embodiment shown herein can be made without departing from the spirit or scope of the invention as defined by the appended claims.

The embodiments of the invention in which an exclusive property or privilege is claimed are defined as follows:

1. A method for deicing aircraft comprising:
 providing a central source of deicing fluid;
 providing means for and heating said deicing fluid;
 providing a plurality of distribution terminals positioned at locations remote from said central source for providing heated deicing fluid thereat, and providing each of said terminals with means for coupling deicing fluid applicating hose means thereto;
 coupling each of said terminals to said central source through conduit means;
 providing means for circulating heated deicing fluid through said conduits and terminals for preheating said conduits;
 providing fluid applicating hose means, coupling said hose means to any of said terminals and applying deicing fluid to an airplane located at said terminal.

2. The method as defined in claim 1 wherein said conduit means comprises a supply conduit coupling said central source to each of said terminals and a return conduit coupling each of said terminals to said central source.

3. The method as defined in claim 2 wherein said central source comprises a tank containing a mixture of water and deicing fluid.

4. The method as defined in claim 3 wherein said heating means comprises a heat exchanger, a first pump, and means coupling said tank, circulation pump and heat exchanger in a loop for the heating of fluid in said tank.

5. The method as defined in claim 4 and including providing a second pump coupled to said conduit means for providing pressurized deicing fluid to said terminals.

6. A deicing system for aircraft comprising:
 a central source of deicing fluid including a first tank for water and a second tank for deicing fluid;
 means for heating said deicing fluid;
 a plurality of distribution terminals positioned at locations remote from said central source for providing deicing fluid thereat;
 conduit means for coupling each of said terminals to said central source; and
 means for circulating heated deicing fluid through said conduits and terminals for preheating said conduits.

7. The system as defined in claim 6 wherein said conduit means comprises a first supply conduit coupling said first tank to each of said terminals, a second supply conduit coupling said second tank to each of said terminals and a return conduit coupling each of said terminals to said first tank.

8. The system as defined in claim 7 wherein each of said terminals includes means for mixing fluid from said first and second supply conduits in a selectable proportion.

9. The system as defined in claim 8 wherein said heating means comprises a heat exchanger coupled to said first tank for heating said water.

10. The system as defined in claim 9 and including first pump means coupled to said first supply conduit and second pump means coupled to said second supply conduit for supplying pressurized water and deicing fluid respectively to said terminals.

11. A deicing system for aircraft comprising:
 a central source of deicing fluid;
 means for heating said deicing fluid;
 a plurality of distribution terminals positioned at locations remote from said central source for providing deicing fluid thereat;
 conduit means for coupling each of said terminals to said central source; and
 means for circulating heated deicing fluid through said conduits and terminals for preheating said conduits and wherein each of said terminals includes connector means coupled to said conduit means for permitting an applicating hose to be coupled in the circulation path of heated deicing fluid for preheating the applicating hose.

12. A centralized deicing system for aircraft comprising:
 a fixed source of heated fluid used for deicing an aircraft;
 a plurality of distribution terminals each located in the area of an aircraft loading ramp, each of said terminals including means for coupling an applicating hose thereto;

conduit means extending between said source of fluid and said terminals; and recirculation means coupled to said conduit means for recirculating heated fluid in said conduit means for preheating said conduit means.

13. The system as defined in claim 12 wherein said conduit means comprises a supply conduit coupling said source to each of said terminals and a return conduit coupling each of said terminals to said source.

14. The system as defined in claim 13 wherein said source comprises a tank containing a mixture of water and deicing fluid.

15. The system as defined in claim 14 wherein said fluid is heated by a heat exchanger and said system includes a first pump, and means coupling said tank, said pump and said heat exchanger in a loop for the heating of fluid in said tank.

16. The system as defined in claim 15 and further including a second pump coupled to said conduit means for providing pressurized deicing fluid to said terminals.

17. The system as defined in claim 16 wherein each of said terminals includes a bypass conduit coupling said supply and return conduits permitting recirculation of heated fluid in said system.

18. The system as defined in claim 12 wherein said source comprises a first tank for water and a second tank for deicing fluid.

19. The system as defined in claim 18 wherein said conduit means comprises a first supply conduit coupling said first tank to each of said terminals, a second supply conduit coupling said second tank to each of said terminals and a return conduit coupling each of said terminals to said first tank.

20. The system as defined in claim 19 wherein each of said terminals includes means for mixing fluid from said first and second supply conduits in a selectable proportion.

21. The system as defined in claim 20 and further including first pump means coupled to said first supply conduit and second pump means coupled to said second supply conduit for supplying pressurized water and deicing fluid respectively to said terminals.

22. The system as defined in claim 12 wherein each of said terminals includes connector means coupled to said conduit means for permitting an applicating hose to be coupled in the recirculation path of heated fluid for preheating the applicating hose.

23. A method for deicing aircraft comprising:

providing a stationary centrally located source of heated water;

providing a stationary centrally located source of deicing fluid;

providing a plurality of stationary distribution terminals and locating same remote from said sources, each terminal including means for coupling an applicating hose thereto;

coupling each of said centrally located sources to said terminals through conduit means for delivery of deicing fluid to said coupling means; and providing a mixing valve means coupled to said conduits for selectively mixing water and deicing fluid delivered to coupling means; and coupling an applicating hose to any of said terminals and applying deicing fluid mixed with heated water to an airplane located at said terminal.

24. A centralized deicing system for aircraft comprising:

a source of heated water;

a source of deicing fluid;

a plurality of distribution terminals remote from said sources, each terminal including means for coupling an applicating hose thereto;

conduit means coupling each of said sources to said terminals for delivery of deicing fluid to said coupling means; and a mixing valve means comprising a valve positioned in each of said terminals coupled to said conduits for selectively mixing water and deicing fluid delivered to coupling means.

25. The system as defined in claim 24 wherein said valves include electrical means for remotely operating said valves.

26. The system as defined in claim 25 and further including means for recirculating heated water in said conduit means coupling said heated water source to said terminals.

27. The system as defined in claim 26 wherein said conduit means comprises a first supply conduit coupling said source of heated water to each of said terminals, a second supply conduit coupling said source of deicing fluid to each of said terminals and a return conduit coupling each of said terminals to said source of heated water.

28. The system as defined in claim 27 and further including first pump means coupled to said first supply conduit and second pump means coupled to said second supply conduit for supplying pressurized water and deicing fluid respectively to said terminals.

29. The system as defined in claim 28 wherein said recirculation means includes a bypass conduit extending between said first supply conduit and said return conduit and pump means for recirculating heated water in a path including said source of heated water, said first supply conduit, said bypass conduit and said return conduit.

30. The system as defined in claim 29 wherein each of said terminals includes connector means coupled to said conduit means for permitting an applicating hose to be coupled in the circulation path of heated water for preheating the applicating hose.

31. A centralized deicing system for aircraft comprising:

a source of heated fluid used for deicing an aircraft;

a plurality of terminals positioned remotely from said source and including a pair of connectors;

supply conduit means coupled to said source and to one connector of said pair of connectors;

return conduit means coupled to the other one of said pair of connectors;

a portable vehicle for the application of deicing fluid to an aircraft including an applicating hose having connector means at opposite ends for coupling said hose between said pair of connectors at said terminal; and means for recirculating heated fluid through said applicating hose for preheating of said hose.

32. The system as defined in claim 31 and further including adjustable bypass conduit means in each of said terminals coupling said supply and return conduits and means for circulating heated fluid through said conduits including said bypass conduit during a standby mode of operation.

* * * * *

UNITED STATES PATENT AND TRADEMARK OFFICE
CERTIFICATE OF CORRECTION

PATENT NO. : 4,191,348
DATED : March 4, 1980
INVENTOR(S) : Sidney J. Holwerda

It is certified that error appears in the above-identified patent and that said Letters Patent are hereby corrected as shown below:

Please change the assignee from "Holwerda-Huizenga Co."

to --Brookside Engineering, Inc.--

Signed and Sealed this

Second Day of September 1980

[SEAL]

Attest:

SIDNEY A. DIAMOND

Attesting Officer

Commissioner of Patents and Trademarks